(12) United States Patent
Mason

(10) Patent No.: US 6,775,639 B1
(45) Date of Patent: Aug. 10, 2004

(54) COMPUTERIZED VEHICLE ALIGNMENT SYSTEM

(76) Inventor: James Herbert Mason, 2 Wellington Street, Narrabeen NSW 2101 (AU)

( * ) Notice: Subject to any disclaimer, the term of this patent is extended or adjusted under 35 U.S.C. 154(b) by 0 days.

(21) Appl. No.: 09/831,445

(22) PCT Filed: Nov. 9, 1998

(86) PCT No.: PCT/AU98/00934
§ 371 (c)(1),
(2), (4) Date: May 9, 2001

(87) PCT Pub. No.: WO99/24781
PCT Pub. Date: May 20, 1999

(30) Foreign Application Priority Data
Nov. 7, 1997 (AU) .............................................. PP0235

(51) Int. Cl.⁷ .............................................. G01C 15/12
(52) U.S. Cl. ........................................ 702/152; 33/288
(58) Field of Search ................................ 702/150–153; 33/286, 288, 608, 600

(56) References Cited

U.S. PATENT DOCUMENTS

| | | | | |
|---|---|---|---|---|
| 4,381,548 A | * | 4/1983 | Grossman et al. ............. | 701/29 |
| 4,811,250 A | * | 3/1989 | Steber et al. ................. | 702/152 |
| 4,890,392 A | * | 1/1990 | Komura et al. ................ | 33/762 |
| 4,977,524 A | * | 12/1990 | Strege et al. .................. | 33/203 |
| 5,029,397 A | * | 7/1991 | Palombi ........................ | 33/288 |
| 5,092,057 A | * | 3/1992 | Hoenig, Sr. .................... | 33/669 |
| 5,148,377 A | * | 9/1992 | McDonald ...................... | 702/95 |
| 5,168,453 A | * | 12/1992 | Nomaru et al. .............. | 700/114 |
| 5,388,057 A | * | 2/1995 | January ........................ | 700/279 |
| 5,553,389 A | * | 9/1996 | Winslow et al. ........... | 33/203.18 |
| 5,774,361 A | | 6/1998 | Colarelli, III et al. | |
| 5,787,599 A | * | 8/1998 | Clifton ........................ | 33/760 |
| 6,115,927 A | * | 9/2000 | Hendrix ....................... | 33/288 |
| 6,658,755 B2 | * | 12/2003 | Arlinsky ...................... | 33/760 |
| 6,683,694 B2 | * | 1/2004 | Cornil ......................... | 356/627 |

* cited by examiner

*Primary Examiner*—Marc S. Hoff
*Assistant Examiner*—Craig Steven Miller
(74) *Attorney, Agent, or Firm*—Jordan and Hamburg LLP

(57) ABSTRACT

A vehicle alignment gauging system measures a linear dimension and generates an output signal corresponding to the measured linear dimension. A storage device stores reference data corresponding to standard reference dimensions for a selected vehicle, and a comparator compares the output signal with a selected reference dimension from the storage means and generates an error signal indicative of the variation therebetween. A visual indication of the magnitude of the variation is provided thereby to provide a quantitative indication of structural misalignment in use.

36 Claims, 9 Drawing Sheets

FIG. 8

VEHICLE MEASUREMENT REPORT

VEHICLE _____ DATE: _____
REG NO: _____ JOB: _____
CLIENT: _____ FILE: _____

DATUM HEIGHT AT CROSS BAR [ 203 ]

| A | VEH.DATA | | DAMAGED | | REPAIRED | |
|---|---|---|---|---|---|---|
| REF | D/S | P/S | D/S | P/S | D/S | P/S |
| WIDTH | G | 1200 | | 0 | | 0 | |
| LENGTH | C | 970 | 970 | -15 | 0 | -1 | 0 |
| HEIGHT | C | 370 | 370 | -7 | -1 | -1 | -1 |
| DIAGONAL | C | 1486 | 1486 | -8 | 0 | -1 | 0 |

COMMENTS: Driver side front tyre badly worn.

DATUM HEIGHT AT CROSS BAR [ ]

| B | VEH.DATA | | DAMAGED | | REPAIRED | |
|---|---|---|---|---|---|---|
| REF | D/S | P/S | D/S | P/S | D/S | P/S |
| WIDTH | | | | | | | |
| LENGTH | | | | | | | |
| HEIGHT | | | | | | | |
| DIAGONAL | | | | | | | |

COMMENTS:

DATUM HEIGHT AT CROSS BAR [ ]

| C | VEH.DATA | | DAMAGED | | REPAIRED | |
|---|---|---|---|---|---|---|
| REF | D/S | P/S | D/S | P/S | D/S | P/S |
| WIDTH | | | | | | | |
| LENGTH | | | | | | | |
| HEIGHT | | | | | | | |
| DIAGONAL | | | | | | | |

COMMENTS:

DATUM HEIGHT AT CROSS BAR [ ]

| D | VEH.DATA | | DAMAGED | | REPAIRED | |
|---|---|---|---|---|---|---|
| REF | D/S | P/S | D/S | P/S | D/S | P/S |
| WIDTH | A | 1478 | | 0 | | 0 | |
| LENGTH | B | 844 | 844 | -22 | 0 | 0 | 0 |
| HEIGHT | C | | | 89 | 89 | 89 | 89 |
| DIAGONAL | D | 1662 | 1662 | -11 | 0 | -1 | 0 |

COMMENTS:

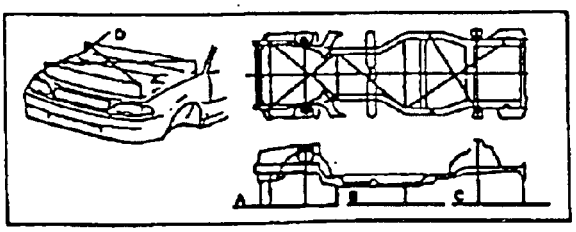

Operator: _____
Signed: _____
Date: _____

_FIG.9_

COMPUTERIZED VEHICLE ALIGNMENT SYSTEM

FIELD OF THE INVENTION

The present invention relates to a system for measuring, and assisting in the alignment and repair, of damaged or potentially damaged structural members.

The invention has been developed primarily for use in the automotive industry, and more particularly in the panel beating trade. The invention will therefore be described with reference to this application. It will be appreciated, however, that the invention is not limited to this particular field of use.

BACKGROUND OF THE INVENTION

In the manufacture of motor vehicles, it is common practice to provide specific datum points in the structure to assist in "jigging" the vehicle during manufacture, and in checking the dimensional accuracy of the finished product. These datum points can take various forms such as holes in the chassis, male or female threaded members such as bolt heads, nuts or studs, and other formations such as pins, lugs and suspension mounting points. They may be spaced apart in both vertical and horizontal planes. The datum points vary significantly from model to model according to various design parameters and practical convenience.

Numerous types of known apparatus are designed to permit measurements to be taken between various datum points on a given vehicle. By comparison with reference charts provided by the manufacturer, or with corresponding measurements taken on the opposite side of the vehicle, such equipment provides an absolute or at least a relative indication of the extent of structural misalignment. This facilitates the evaluation and repair of damaged or potentially damaged vehicles by panel beaters. Most known devices, however, have been found to be inadequate in various respects.

One type of prior art device consists in a peripheral reference frame rotatably or otherwise connected to a floor mounted anchorage assembly, so as to extend generally around the vehicle. Such devices are not adapted for direct connection to the datum points on the vehicle, and so are not able to provide an accurate or direct quantitative correlation between the various datum points and the manufacturers specifications. At best, they provide a relative measure of the inconsistency between comparable points on opposite sides of the vehicle. This is of little assistance if both sides of the vehicle have been damaged, and in any case will not reveal distortion in certain planes. Moreover, such devices tend to be structurally flimsy, and are inherently prone to excessive deflection, particularly adjacent the front and rear extremities of the vehicle where accurate measurement is critical. Further, in such measurement systems, it is difficult or impossible to align the vehicle precisely with the floor mounted anchorage assembly. For these reasons, such devices are often not capable even of providing consistent comparative measurements between corresponding points on the vehicle, which is necessary to provide a reliable measure of the degree of misalignment to the required level of accuracy.

Other known devices are adapted for direct connection to specific datum points, and so are capable of correlating measurements between these points on the vehicle with dimensional specifications provided by the manufacturer. However, most such devices are complex, expensive, cumbersome, involve a relatively large number of components, and are generally difficult and time consuming to use. Furthermore, most known devices of this type are capable only of providing quantitative measurements between longitudinally or transversely spaced datum points. As such, they cannot usually detect parallelogram type deflection in the vehicle frame, or deformation in the body panels beyond certain datum points.

Some devices are known which are adapted for direct connection to the datum points on the vehicle and are also capable of providing diagonal and other non-orthogonal measurements. There is a significant remaining difficulty, however, in that many of the measurements provided on vehicle manufacturers' specification sheets are defined relative to arbitrary reference planes, which are usually different from the inherent reference planes associated with the measurement apparatus. Consequently, as each measurement is taken, it is necessary for the operator to perform an arithmetic calculation in order to correlate the actual measurements taken with the reference data and thereby ascertain the absolute magnitude of the extent of misalignment. These calculations can become complex, particularly where a number of correction factors or cumulative measurements are involved, and this gives rise to a significant possibility for human error.

Partly because of this difficulty dedicated jigs, frames or the like are sometimes manufactured for certain common makes and models of vehicle. However, these tend to be expensive and require considerable set up time. Consequently, such devices tend only to be economically viable in connection with major repairs and are not readily applicable to a wide range of vehicles.

A further difficulty with known systems is that there is no means for verifying after the event the extent of initial misalignment or the deviation from the manufacturer's specifications after repair. As a result, vehicle repairs can be substandard and once the vehicle has been reassembled, the accuracy of the repairs can be difficult to check. Insurance companies are increasingly requiring quality assurance procedures to provide a means of confirming the damage to, and the subsequent rectification of, the vehicle in quantitative terms. Currently known systems do not enable this to be done in a convenient, accurate, reliable and cost effective manner.

It is an object of the present invention to overcome or substantially ameliorate one or more of the disadvantages of the prior art, or at least to provide a useful alternative.

DISCLOSURE OF THE INVENTION

Accordingly, the invention provides a vehicle alignment gauging system including measuring means, output signal generation means adapted to generate an output signal corresponding to dimensions indicated by the measuring means, storage means to store reference data corresponding to standard reference dimensions for a selected vehicle, comparator means to compare the output signal with a selected reference dimension from the storage means and to generate an error signal indicative of the variation therebetween, and variation display means to provide a visual indication of the magnitude of the variation, thereby in use to provide a quantitative indication of structural misalignment.

Preferably, the measuring means include an extendable measuring tape, and the output signal is indicative of an operative or extended length of the tape.

Preferably, the output signal generation means include a position transducer adapted to generate the output signal in the form of an electric current or voltage, indicative of the extended length of the measuring tape.

Preferably, the system further includes output signal display means to display a visual indication of the extended length of the measuring tape according to the output signal, thereby to permit visual correlation between indicia on the measuring tape and the output signal.

Preferably, the system includes a pair of said measuring tapes, one being adapted for measurement in horizontal planes and the other being adapted for measurement in vertical planes. Preferably, the measuring tapes are supported in mutually orthogonal relationship in or on a common housing.

Preferably, the output signal display means associated with each of the measuring tapes is disposed on or adjacent the housing. The housing preferably also includes a "black box" containing electronic control and signal processing circuitry.

Preferably, the storage means is associated with a portable computer and may include a compact disc, a floppy disk, an internal disk drive, an external disk drive, a magnetic tape drive, random access memory (RAM), read only memory (ROM), or any other suitable electronic or magnetic storage mechanism.

Preferably, the comparator means takes the form of software associated with the computer. The software is preferably configured to perform a sequence of operations using the reference data and the output signal in order to generate the error signal. Preferably, the software is also configured to enable an operator to select reference dimensions from a range of standard reference dimensions, contained in the storage means.

Preferably, the variation display means are disposed on or adjacent the housing to provide direct feedback of the error signal to the operator while working on the vehicle.

Preferably, recordal means are adapted to record the error signal in relation to the corresponding reference dimension in response to a command input by the operator, thereby to provide a permanent record of the extent of structural deviation from the manufacturer's specification, both before and after repair work has been carried out Preferably, the system further includes a remotely operable scrolling mechanism located on or adjacent the housing, to permit the operator to scroll through a range of preselected reference dimensions and to view on the variation display means a corresponding sequence of deviations while working on the vehicle.

Preferably, the system further includes a datum bar, a pair of first carriage assemblies slidably mounted to the datum bar, attachment means adapted releasably to secure each of said first carriage assemblies to a respective datum point on the vehicle and thereby to suspend the datum bar in a transverse orientation beneath the vehicle, and a trammel bar connected at one end to said datum bar by connection means, the connection means being adjustable to selected positions along the datum bar and permitting a degree of universal movement of the trammel bar relative to the datum bar.

Preferably, the housing is adapted for mounting on the trammel bar to provide measurements relative to the datum bar and hence relative to datum points on the vehicle.

Preferably, the housing further includes a slidable reference pointer adapted for connection to the vertically oriented measuring tape and adapted for engagement with selected datum points on the vehicle with the trammel bar in a horizontal orientation. In this way, the vertical tape provides a measure indicative of the vertical distance between the datum bar and the reference pointer, and the horizontal tape provides a measure of the horizontal distance between the datum bar and the reference pointer.

BRIEF DESCRIPTION OF THE DRAWINGS

A preferred embodiment of the invention will now be described, by way of example only, with reference to the accompanying drawings in which:

FIG. 8 shows a sample computer screen from the system of FIG. 1, as used by the operator to set up a job, input reference data, input measurement data, and compile a report; and FIG. 9 shows a sample vehicle measurement report of the type produced by the gauging system according to the invention.

PREFERRED EMBODIMENT OF THE INVENTION

Figure 1:
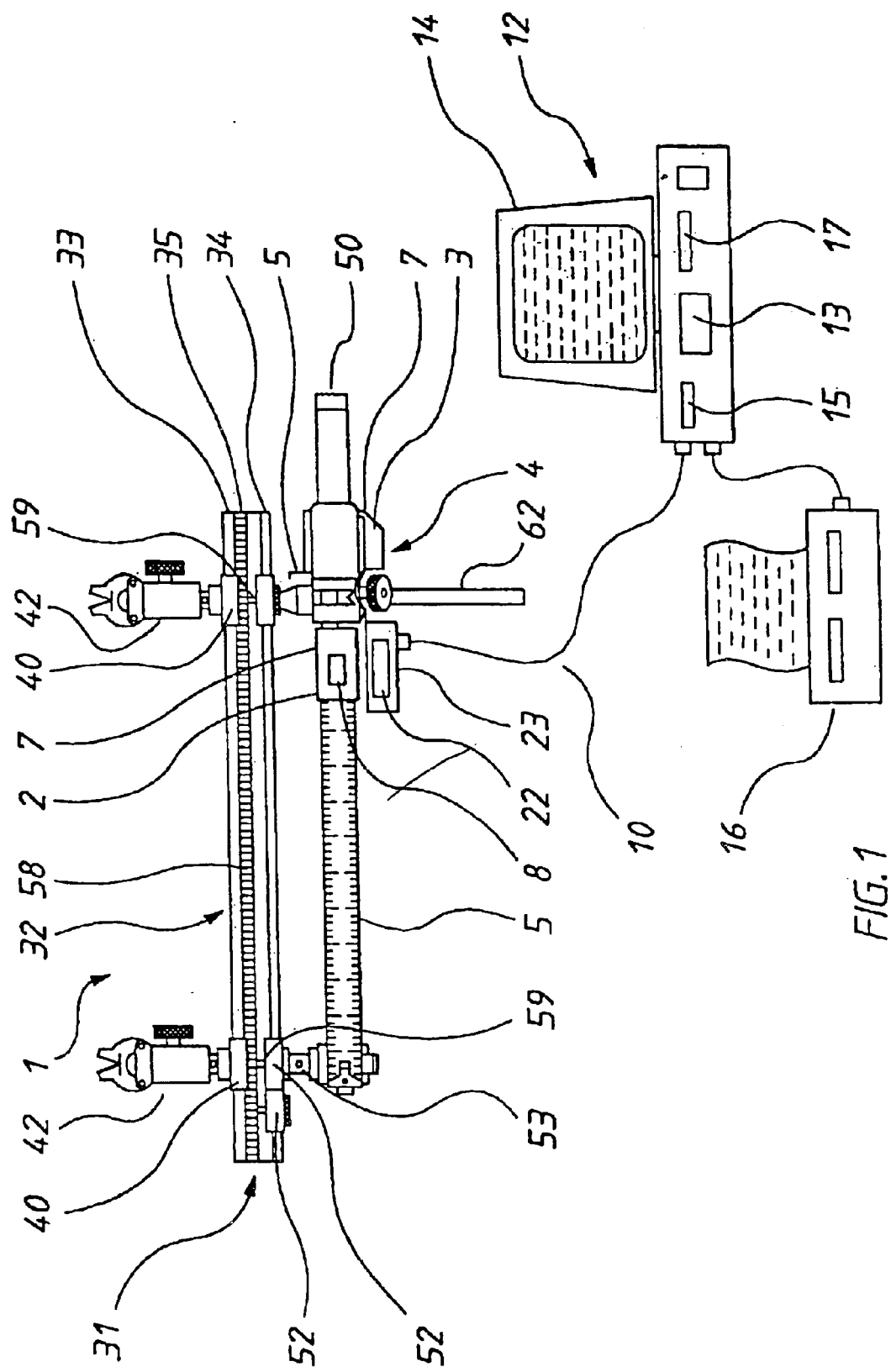
FIG. 1 is a front elevation view showing a vehicle alignment gauging system according to the invention.
Figure 2:
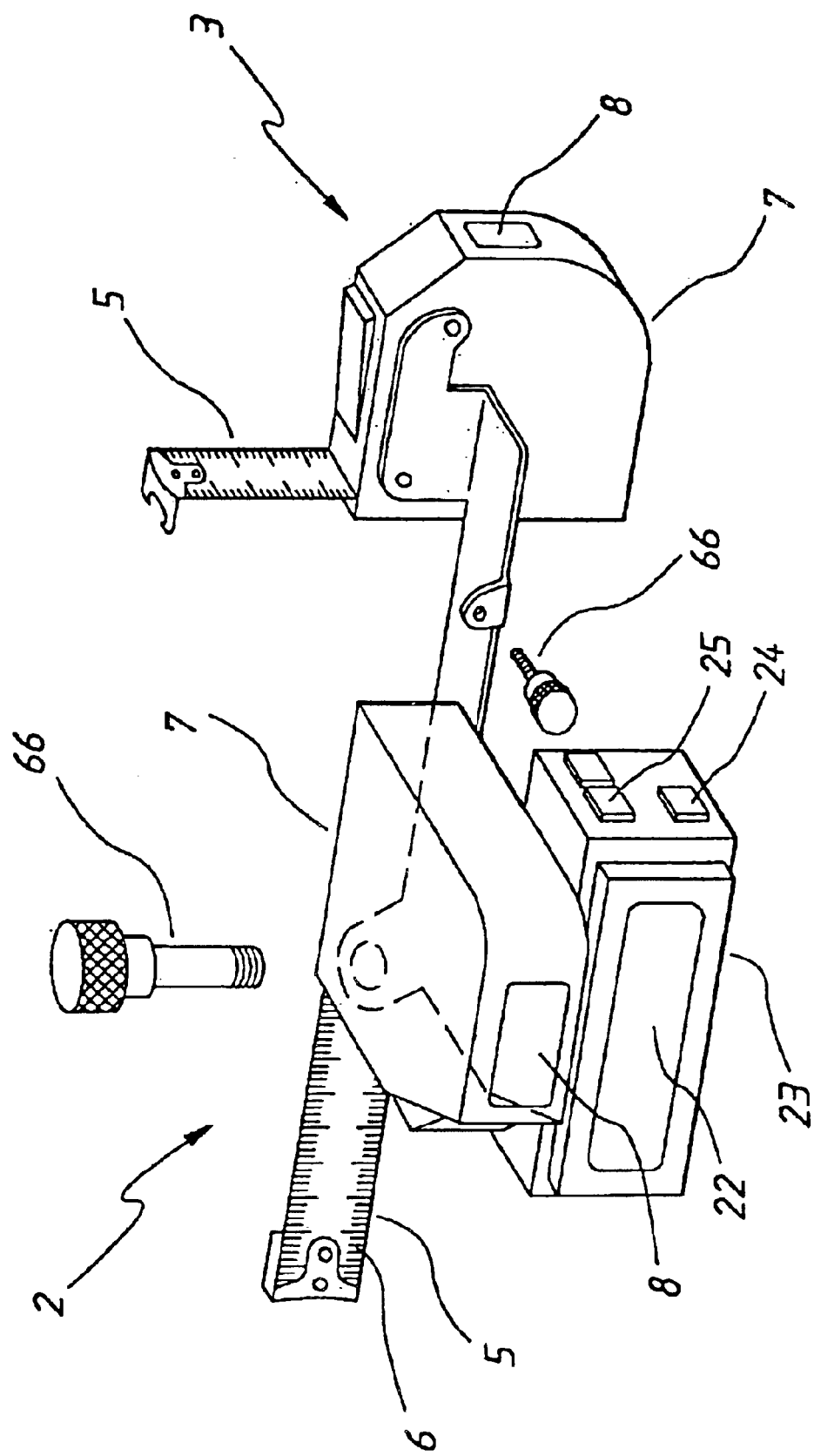
FIG. 2 is an enlarged perspective view showing the digital measuring tapes mounted orthogonally on the housing of the system of FIG. 1, according to a first is embodiment of the invention.

Referring initially to FIGS. 1 and 2, the invention provides a digital vehicle alignment gauging system 1. As best seen in FIG. 2, the system includes measuring means in the form of a first extendable measuring tape 2 and a second extendable measuring tape 3. The measuring tapes 2 and 3 are mounted to a housing 4, in mutually orthogonal relationship to form an integrated measuring module. The first tape 2 is generally configured to take horizontal measurements while the second tape 3 is generally configured to take vertical measurements. Each tape measure consists of a flexible steel blade 5 calibrated with visual indicia 6. Each tape is adapted to extend by unwinding from a spool which is rotatably mounted within the respective casing 7. A spring (not shown) within each housing is disposed resiliently to retract the tape by rewinding onto the spool, in conventional manner.

Output signal generation means are adapted to generate an output signal indicative of the operative or extended length of each tape. The output signal generation means ideally take the form of a position transducer, in which case the output signal takes the form of an electric current or voltage indicative of the extended length of the tape. In the preferred embodiment, the position transducer comprises a rotary potentiometer associated with the respective tape spool. Alternatively, however, a linear potentiometer associated with the tape blade may be used. Other alternatives include an optical reader operable in conjunction with holes punched in the tape blade, or a bar code reader in conjunction with a bar code on the tape blade. A digital vernier system or even laser distance measuring techniques may also be used. The casing 7 of each measuring tape includes an LCD screen 8, which visually displays measurements corresponding to the extended length of the tape in digital form. The output signal, as well as generating a display on the LCD screen 8, is transmitted to an RS 232 output cable 10, as described in more detail below. Alternatively, the output transmission may be achieved using an RF or infrared signal encoder, or other suitable wireless transmission means.

The system further includes storage means, preferably in the form of a portable computer 12 complete with microprocessor 13, screen 14, internal memory 15 and printer 16. The data storage mechanism associated with the computer may be a CD ROM, a floppy disk, an internal hard disk, a magnetic tape, or other suitable electronic or magnetic storage means.

Figure 7:
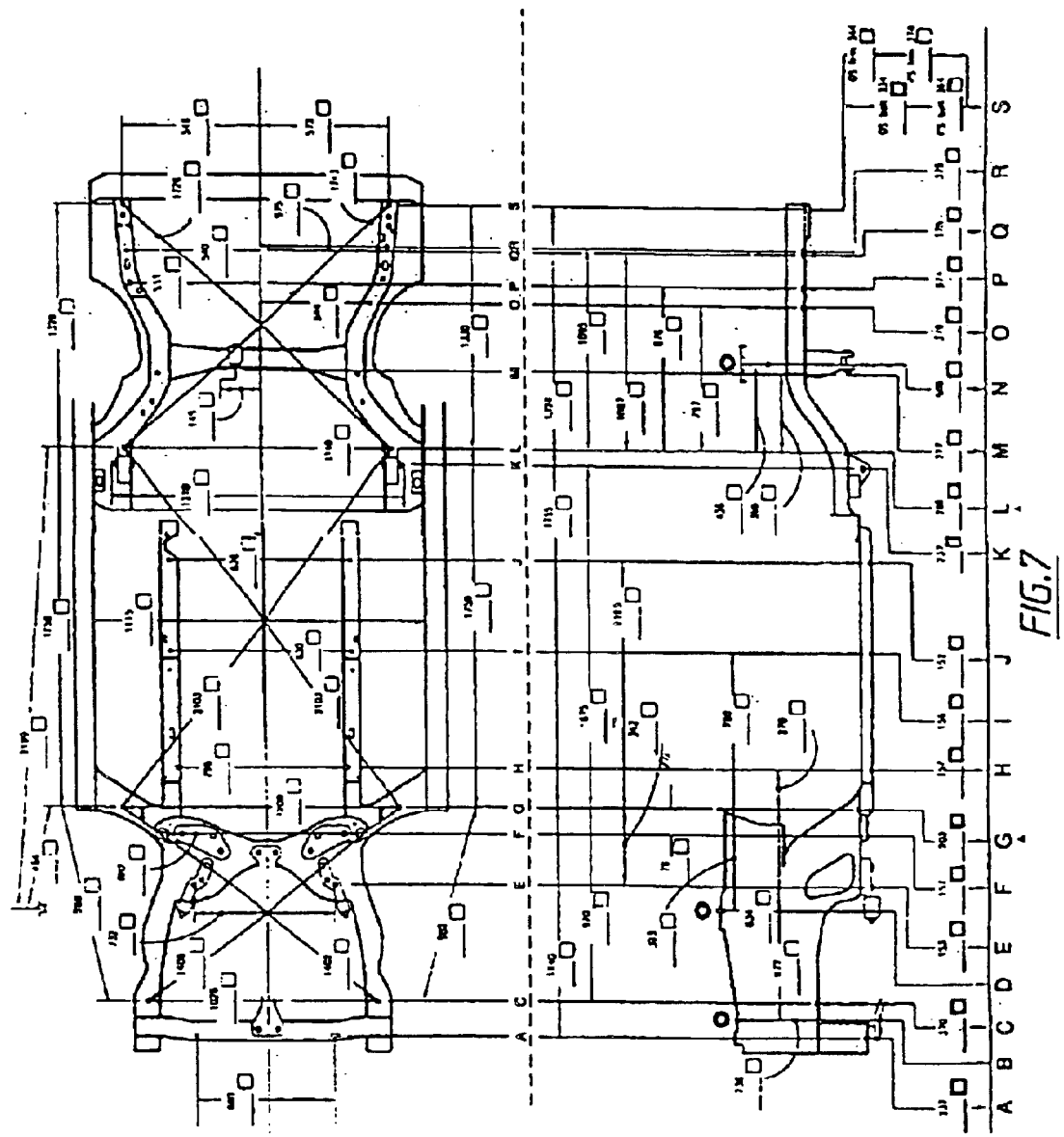
FIG. 7 shows a typical example of a data specification sheet of the type provided by vehicle manufacturers.

The storage means are adapted to store reference data corresponding to standard dimensions for a selected vehicle, as provided by the vehicle manufacturer. An example of a typical vehicle manufacturer's data sheet is shown as FIG. 7. Such data may be obtained from the manufacturer on CD ROM or the like, but may otherwise be keyed into the system manually.

The system further includes comparator means, shown symbolically as feature 17, in the form of software loaded onto the computer. The software is configured to perform a predetermined sequence of operations which compare the output signals from the respective measuring tapes with corresponding reference dimensions stored in the computer. The software then generates an error signal indicative of the variation between the reference dimension and the corresponding dimension as actually measured.

The system further includes variation display means in the form of an LCD screen 22 on the housing or module 4. The error signal from the computer is fed to a "black box" 23 containing the signal processing circuitry within the housing, and displayed digitally on the LCD screen 22 as a variation measurement. This provides a direct quantitative indication of the degree of structural misalignment to the operator, while working on the vehicle.

The software preferably also includes a recordal function adapted to record the error signal as a variation relative to the corresponding reference dimension. This function is activated in response to an input by the operator, via the "transmit measurement" key 24 on the housing, to provide a record of the extent of initial structural deviation from the manufacturer's specification before the repair work. It also enables the operator to record the deviation after the repair work has been carried out. The function thus provides a permanent record of both the extent of initial damage and the accuracy of the subsequent repairs, as described more fully below.

The computer is connected to the printer 16, to enable the operator to produce a hard copy of the report after the repair operations have been performed. This can be used as a permanent record to confirm to the insurer and the vehicle owner that any deviations from the reference dimensions according to the manufacturer's specifications are within acceptable tolerances.

A scroll key 25 is also provided on the housing 4 to permit the operator to scroll through a range of preselected reference dimensions stored in the computer. Using the "variation display" key 27, the operator can also view directly on the LCD screen 22, a corresponding sequence of variation measurements while working on the vehicle.

Figure 3:
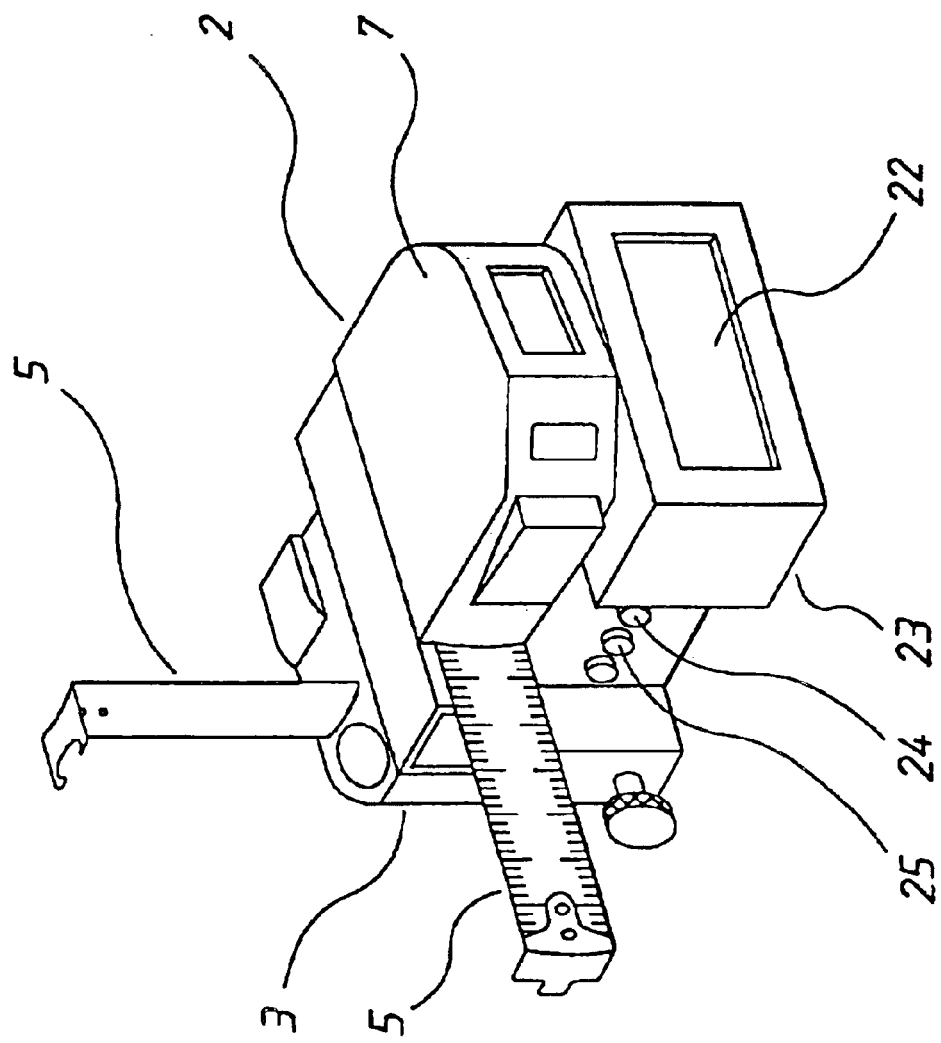
FIG. 3 is a perspective view showing the measuring tapes and housing according to a second embodiment of the invention.
Figure 4:
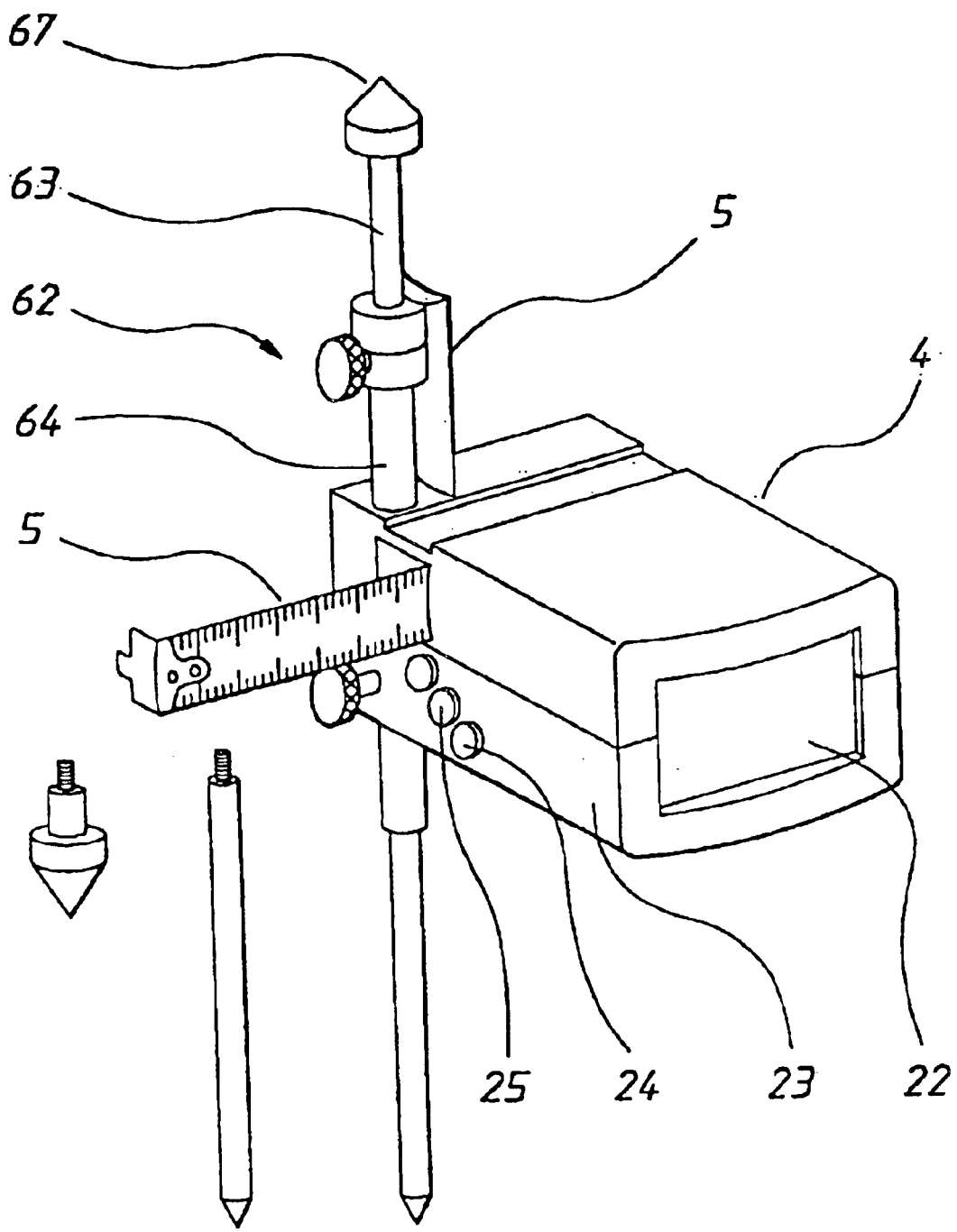
FIG. 4 is a perspective view showing the measuring tapes and housing together with a vertical reference pointer, according to a third embodiment of the invention.

FIGS. 3 and 4 show alternative embodiments and configurations of the measurement module which includes the measuring tapes, the housing, the black box containing the electronic control circuitry, and associated bracketry. FIG. 4 additionally shows the module as fitted with a reference pointer assembly, the operation of which will be described more fully below.

The system has been designed specifically for use in conjunction with the basic mechanical components of a vehicle alignment gauging apparatus, of the type described in Australian Patent 669,195, the full contents of which are hereby incorporated by way of cross reference. This mechanical aspect of the apparatus will not be described fully here, in view of the incorporation by cross reference. For convenience, however, the basic elements are described briefly below.

Figure 5:
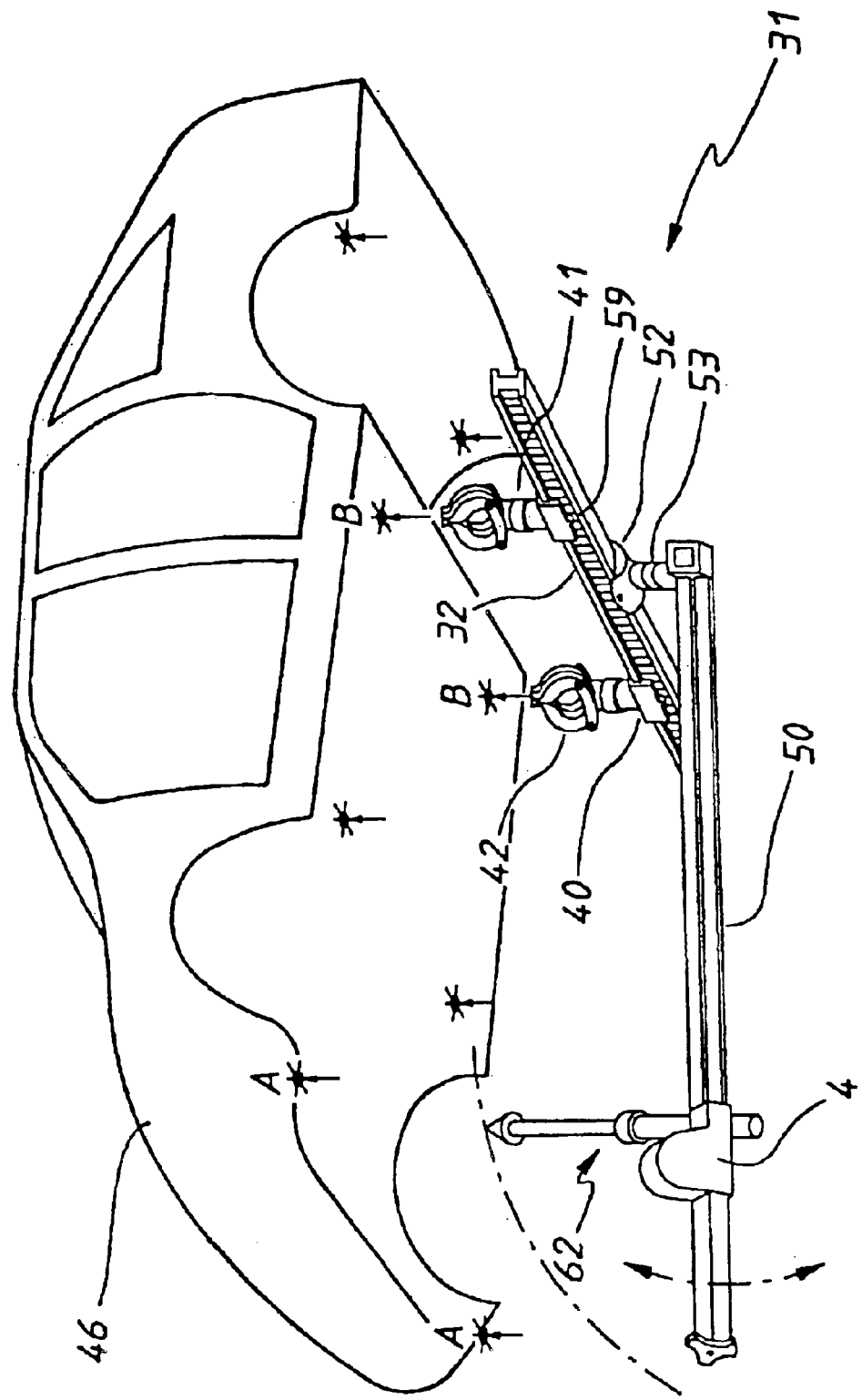
FIG. 5 shows the gauging apparatus of FIG. 1 presented to the datum points on the underside of a vehicle body.
Figure 6:
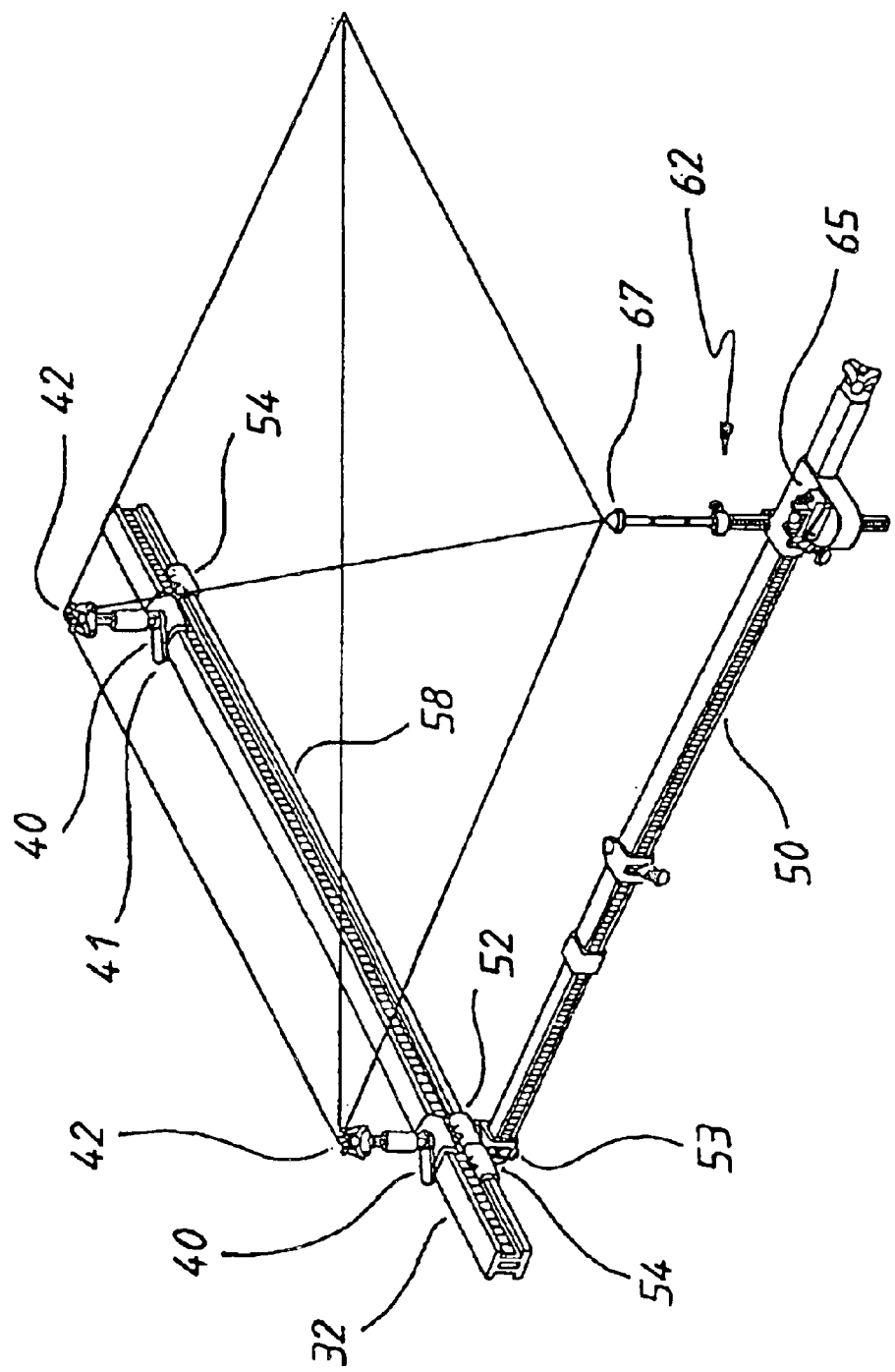
FIG. 6 is a diagrammatic perspective view showing the correlation of the datum points of the vehicle shown in FIG. 5.

Referring to FIGS. 1, 5 and 6, the gauging apparatus 31 includes a transverse datum bar 32 comprising respective upper and lower flanges 33 and 34, interconnected by an intermediate web section 35. Two first carriage assemblies 40 are slidably mounted to the upper flange 33 so as to traverse the datum bar. Locking mechanisms 41 are provided to permit the carriage assemblies to be releasably secured in selected positions on the datum bar. Interchangeable attachment mechanisms 42 are adapted releasably to secure each carriage assembly 40 to a selected datum point on the vehicle body 46, thereby to attach the datum bar to the underside of the vehicle, usually in a generally transverse orientation.

A trammel bar 50 is connected at one end to the datum bar 32 by a connecting assembly 51. The connecting assembly comprises a trammel carriage 52 adapted slidably to traverse the lower flange 34 of the datum bar, and a universal joint 53 in the form of a double swivel. The universal joint permits independent rotation about intersecting orthogonal axes. Like the first carriages 40, the trammel carriage 52 incorporates a locking mechanism. Thus, the trammel carriage permits the proximal end of the trammel bar to be moved to and locked in selected positions along the datum bar. At the same time, the universal joint permits at least a limited degree of universal movement of the trammel bar. Adjustable end stops 54 define the limits of lateral movement of the trammel carriage on the datum bar.

The datum bar further incorporates a calibrated scale 58 displayed on the vertical is web section 35. The first carriages 40 and the trammel carriage 52 incorporate respective pointers 59. The scale 58 and pointers 59 together provide indications of the relative positions of the carriages and the trammel bar on the datum bar, permitting the location of each of the carriages to be determined relative to the datum points on the vehicle.

The housing 4 is adapted to slide onto the remote end of the trammel bar. The square section profile of the trammel bar and the complimentary square configuration of the aperture in the housing prevents rotation of the measurement module, but permits longitudinal sliding movement along the trammel bar.

The apparatus further includes an adjustable reference pointer assembly 62 associated with the housing 4 (see FIG. 4). The reference pointer comprises an inner rod 63 slidably disposed within a tubular rod housing 64. The upper end of the rod terminates in a conical tip 67. The blade 5 of the vertical measuring tape 3 is connected to the rod housing 64 such that the tape 3 measures the vertical distance between the tip of the pointer and the trammel bar. The blade of the horizontal tape 2 is connected to the proximal end of the trammel bar, so as to measure the horizontal distance between the reference pointer and the datum bar.

The housing 4 further includes a spirit level 65 to permit the trammel bar to be levelled and oriented horizontally, with the reference pointer engaging a selected datum point on the vehicle.

Turning now to describe briefly the operation of the system, and with particular reference to FIGS. 1 and 5 and 6, suitable attachment fittings 42 are first selected according to the type of vehicle, the particular configuration of datum points, and the nature of die damage sustained. The selected attachment fittings are then operatively affixed to the respective carriage assemblies 40. The attachment fittings are then offered up and secured to the selected datum points, to fix the datum bar 32 in position (see FIG. 5). In the majority of cases, the datum bar will be suspended in a generally horizontal orientation beneath the vehicle, transverse to the vehicle centre line.

The adjustable spirit level assembly is then removed from its mounting on the housing, placed on an appropriate notionally horizontal component of the vehicle such as a chassis rail, door sill or the like, and zeroed. The spirit level is then replaced on housing, which in turn is slidably mounted onto the remote end of the trammel bar. In this way, the spirit level is used as a surrogate level reference relative to the vehicle, so that the vehicle itself need not be precisely level. The carriage assemblies 40 are manually secured using the respective locking mechanisms 41 such that the datum bar is firmly secured relative to the selected datum points. The end stops are also secured in position such that the trammel bar is positioned directly below the respective datum points at the limits of lateral excursion. The overall length of the trammel bar can then also be adjusted telescopically to the required length having regard to the particular datum points which need to be correlated.

With the apparatus set up in this way, virtually any points on the vehicle body can be correlated. For example, to measure the horizontal distance between the datum points A and B, the carriage is first moved to abut the appropriate end stop 54 on the corresponding side of the datum bar. The end stop then locates the proximal end of the trammel bar in a zero position immediately below datum point B. The housing is then slid along the trammel bar until the reference pointer aligns with datum point A. The housing is secured in this position using grub screws 66 (FIG. 2). During this process, the first measuring tape 2 unwinds from its spool and the digital display on the associated LCD screen 8 indicates the distance between datum points A and B. To measure the corresponding distance between datum points A' and B' on the other side of the vehicle, the connecting carriage 52 is simply slid along the datum bar until it abuts the end stop on the opposite side, at which point the proximal end of the trammel bar is positioned directly below datum point B'. Point B' thus becomes the new reference point for the trammel bar. The pointer 67 is then presented to the corresponding datum point A'.

By levelling the trammel bar using the spirit level in each case and adjusting the reference pointer so as to contact the respective datum point A or A', the second measuring tape 3 indicates the relative height of the pointer and hence the vertical distance between A and B, or A' and B'. This and various other measurement techniques are described in more detail in Australian Patent 669,195.

Figure 8:
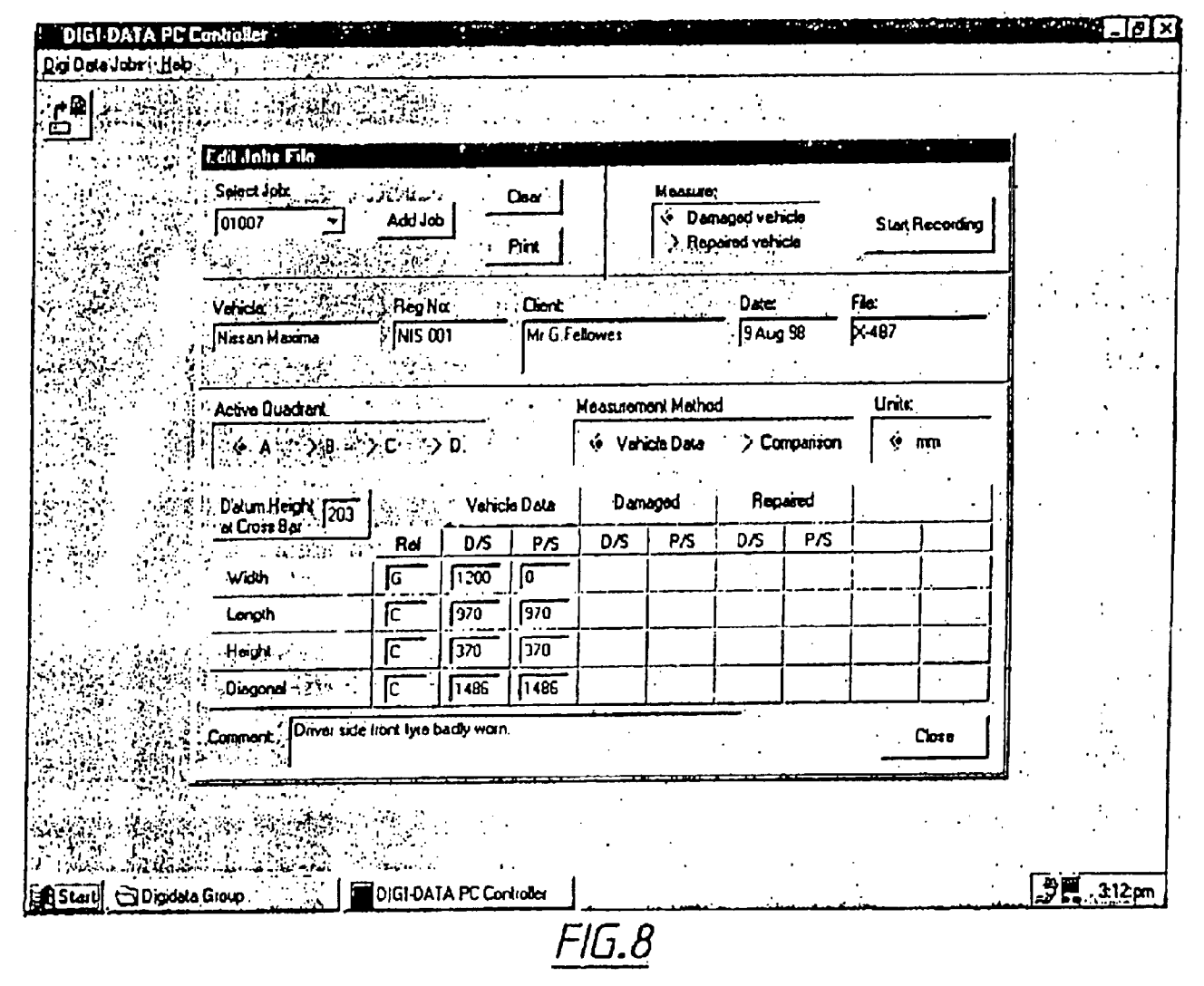

Turning now to consider the operation of the electronic aspects of the system, and referring initially to FIG. 8, the manufacturer's specification for the selected vehicle is initially loaded onto the computer, typically from a CD ROM. Alternatively, the information can be entered manually from a data sheet using the interactive software. Additional information may be added, such as a job number, vehicle registration number, client name, and date. Additional reference data-can also be added to account for fixed dimensional variations associated with the gauging apparatus itself. This is important if the reference planes which the manufacturer's specifications are based on are different from the reference plants inherent in the structure of the gauging apparatus. These calibration factors account for the fixed heights of the attachment mechanisms 42, and the like; The operator can also select from options to indicate whether the vehicle being measured is damaged, or repaired.

A quadrant or zone of the vehicle to be measured is then selected and defined as "A", "B", "C" or "D", as shown. The specifics of this will depend upon the nature and extent of the damage, and the structure of the software. Coordinates are then entered to define the selected datum points. Related measurements for length, width, height, and diagonals are entered according to the manufacturer's specifications. This data can either be keyed in manually by the operator from the vehicle data sheet, or extracted automatically by the software from specification data provided on CD ROM, or in electronic form. This information then appears on the computer screen as "vehicle data". Corresponding fields are established by the software to receive measurements from the vehicle in "damaged", and "repaired" conditions. At this stage, however, these fields are blank as shown in FIG. 8. The operator then initiates the "recording" function of the software which transmits the vehicle data measurements to the module 4 on the gauging apparatus.

The operator then proceeds to measure the vehicle, one measurement at a time, using the datum bar, trammel bar, housing, and reference pointer, as described above. Using the scroll key 25 on the measurement module, the operator can scroll through and selectively display on the LCD screen 22 the preselected dimensions to be checked. Using the "variation display" key 27, the operator can display on the screen the variation between each specified dimension and the corresponding measurement. By manipulating the vehicle (using conventional panel beating and alignment techniques) until the displayed variation approaches zero, the operator can progressively rectify the structural deformations. Throughout the process, the operator is provided continuously with feedback as to the extent of misalignment, without at any stage having to move away from the measuring apparatus, or having to refer back to the computer screen or the data sheet.

Finally, when the variation between the actual measurement and the specified dimension has been reduced to within an acceptable tolerance, the "transmit" key 24 on the housing is used to transmit the final measurement back to the computer to compile a data report, again without the operator having to move away from the vehicle.

With the possibility for wireless transmission of data, for example using RF or infrared transmitters and receivers, there need be no physical link between the measurement module and associated structural aspects of the system, and the computer. This avoids the inconvenience and potential dangers of operators tripping over data cables. It also enables the computer and associated hardware to be positioned away from the vehicle being repaired, thereby maximising access to the vehicle. This facility also enables the expensive computer hardware to be housed securely, for example in a lockable site office, without occupying valuable space on the workshop floor.

As shown in FIG. 9, the software can then be used to compile a data report, which displays in corresponding fields the vehicle reference data, the measurements from the damaged vehicle, and the measurements from the repaired vehicle. In this way, the extent of the initial damage and the final deviation if any from the manufacturer's specifications after repair are readily apparent. This report can be displayed on the computer screen or printed out as a hard copy, to be signed off by the operator as part of an insurance report.

If reference data on the vehicle is not readily available, the system can be used in comparison mode, which relies on the internal symmetry of the vehicle itself. In this mode, measurements are first taken on an undamaged portion of the vehicle and transmitted to the computer using the "transmit" control key 24 on the housing, for use as reference data. Corresponding measurements are then taken on the damaged portion of the vehicle and the difference displayed as the variation or error measurement Repair then proceeds as described above.

It will be appreciated from the foregoing description that the invention provides a simple, efficient and cost effective system for conducting a wide range of measurements on damaged vehicles, either by correlation to data sheets, or direct comparison of corresponding data points on the vehicle. The system displays the relevant information on the measurement module itself which also includes the principal command keys required to drive the software. This avoids the need for the operator to move away from the vehicle during the measurement and repair process. The system is thus easy to use by a single operator and can be adapted to fit on virtually any vehicle with minimal set up time. It is capable of providing both orthogonal and diagonal measurements, as well as comparative measurements in complex spatial orientations. Because the various calculations and computational steps are performed by computer, the process is greatly accelerated and the possibility of human error largely eliminated. Also of benefit is the facility enabling the operator to produce a report sheet setting out reference data, measurements from the vehicle before repair, and corresponding measurements after repair. This verifies the extent and accuracy of the work, which is often difficult and time consuming to assess after the event, once the vehicle has been reassembled. In all these respects, the invention represents a commercially significant improvement over the prior art.

Although the invention has been described with reference to specific examples, it will be appreciated by those skilled in the art that the invention may be embodied in many other forms.

What is claimed is:

1. A system for gauging alignment of a vehicle, comprising:

means for mounting at least one linear dimension measuring device to the vehicle in such manner that the measuring device is locatable at a position along the vehicle at which a linear dimension measurement taken by the linear dimension measuring device while the measuring device is located at the first position will be measured relative to a first datum point on the vehicle, whereby operation of said measuring device to measure a distance to an other datum point spaced apart from said first datum point while said measuring device is located at the first position yielding a linear dimension between the first datum point and the other datum point;

output signal generation means for generating an output signal corresponding to the linear dimension indicated by the operation of the measuring device;

storage means for storing reference data is stored corresponding to standard reference dimensions for a selected vehicle;

comparator mean for comparing the output signal with a selected reference dimension from the storage and for generating an error signal indicative of the variation therebetween; and variation display means for providing a visual indication of a magnitude of the variation to thereby provide a quantitative indication of structural misalignment.

2. A system according to claim 1, wherein:

said measuring means include an extendable measuring tape; and the output signal is indicative of one of an operative and extended length of the tape.

3. A system according to claim 2, wherein said measuring tape comprises a flexible steel blade calibrated with visual indicia and which is extendable by unwinding from a spool contained within a housing.

4. A system according to claim 3, further including bias means for applying a biasing force tending resiliently to retract the tape by rewinding onto the spool.

5. A system according to claim 3, wherein the variation display means are disposed one of on and adjacent the housing to provide direct feedback of the error signal to the operator while working on the vehicle.

6. A system according to claim 3, further comprising a remotely operable scrolling mechanism, located one of on and adjacent the housing, for permitting an operator to scroll through a range of selected reference dimensions and to view on the variation display means a corresponding sequence of calculated variation measurements derived from the error signals while working on the vehicle.

7. A system according claim 2, wherein the output signal generation means include a position transducer which generates the output signal in a form of one of an electric current and a voltage indicative of said one of the operative and extended length of the measuring tape.

8. A system according to claim 7, wherein the position transducer is a rotary potentiometer coupled with the tape spool.

9. A system according to any one of claim 7, wherein the position transducer is a linear potentiometer linked with the tape blade.

10. A system according to claim 2, further including output signal display means for displaying a visual indication of said one of the operative and extended length of the measuring tape according to the output signal, thereby to permit visual correlation between the indicia on the measuring tape and the output signal.

11. A system according to claim 10, wherein the output signal display means associated with each of said measuring tape are disposed one of on and adjacent said housing.

12. A system according to claim 1, wherein said at least one linear dimension measurement device includes a pair of said measuring devices, one of said measuring devices of the pair being disposed for measurement in horizontal planes and an other of the pair being adapted for measurement in vertical planes.

13. A system according to claim 12, wherein said pair of measuring devices are supported in mutually orthogonal relationship within a common housing, forming part of an integrated measurement module.

14. A system according to claim 12, wherein said housing further includes a slidable reference pointer connectable with the vertically oriented measuring tape for engagement with selected datum points on the vehicle such that with the trammel bar in a generally horizontal orientation, the vertical tape provides a measure indicative of the vertical distance between the datum bar and the reference pointer, and the horizontal tape provides a measure of the horizontal distance between the datum bar and the reference pointer.

15. A system according to claim 1, wherein said storage means are part of a computer.

16. A system according to claim 15, wherein the comparator means take the form of software configured to perform a sequence of operations using the reference data and the output signal in order to generate the error signal.

17. A system according to claim 16, wherein the software is configured to enable an operator to select a reference dimension from a range of standard reference dimensions for the vehicle from the storage means.

18. A system according to claim 1, wherein said storage means include at least one of a CD ROM, a floppy disk, an internal hard disk, a magnetic tape drive, random access memory (RAM) and read only memory (ROM).

19. A system according to claim 18, wherein said reference data is initially provided in CD ROM form for downloading onto a disk drive associated with the computer.

20. A system according to claim 1, further comprising recording means for recording the error signal in relation to the corresponding reference dimension in response to a command input by an operator, thereby to provide a record of the extent of structural deviation from specification after repair work has been carried out.

21. A system according to claim 20, wherein the recording means include printing means for producing a hard copy of a report after repair operations have been carried out, to confirm that deviations from specification are within acceptable tolerances.

22. A system according to claim 1, further comprising;
a datum bar;
a pair of first carriage assemblies slidably mounted to the datum bar;
attachment means for releasably securing each of said first carriage assemblies to a respective datum point on the vehicle and thereby to suspend the datum bar in a transverse orientation beneath the vehicle; and
a trammel bar connected at one end to said datum bar by connection means, the connection means being adjustable to selected positions along the datum bar and permitting a degree of universal movement of the trammel bar relative to the datum bar.

23. A system according to claim 22, wherein the measuring means are mountable on the trammel bar to provide measurement readings relative to the datum bar.

24. A system according to claim 23, wherein the connection means include a trammel carriage adapted to traverse the datum bar and a universal joint mounted to the trammel carriage, to permit independent relative rotation about non-parallel axes.

25. A system according to claim 22, further comprising adjustable leveling means to indicate when the trammel bar is oriented horizontally relative to the vehicle.

26. A system according to claim 25, wherein the leveling means include a detachable spirit level.

27. A system according to claim 1, further comprising at least one attachment mechanism for releasably securing at least a portion of said dimension measuring means to a vehicle being measured.

28. A system for gauging alignment of a vehicle, comprising:
at least one linear dimension measuring device mountably received to the vehicle in such manner that the measuring device is locatable at a position along the vehicle at which a linear dimension measurement taken by the linear dimension measuring device while the measuring device is located and mounted at the first position will be measured relative to a first datum point on the vehicle, whereby operation of said measuring device to measure a distance to an other datum point spaced apart from said first datum point while said measuring device is located at the first position yielding a linear dimension between the first datum point and the other datum point;
a signal generator for generating an output signal corresponding to the linear dimension indicated by the operation of the measuring device;
storage in which reference data is stored corresponding to standard reference dimensions for a selected vehicle;
a comparator which compares the output signal with a selected reference dimension from the storage and which generates an error signal indicative of the variation therebetween; and
a display on which a visual indication of a magnitude of the variation is displayed to thereby provide a quantitative indication of structural misalignment.

29. A system according to claim 28, further comprising mounting structure for retaining the measuring device to the vehicle, said mounting structure including:
a first elongated member mountable in fixed engagement with the vehicle; and
a second elongated member slidably mounted proximate a terminal end thereof to the first elongated member to allow said second elongated member to slide along the first elongated member between a first position and a second position corresponding to a first datum point and a second datum point.

30. A system according to claim 29, wherein said second elongated member is pivotable relative to the first elongated member along a vertical axis, thereby allowing the second member to move along a horizontal arc.

31. A system according to claim 30, wherein said second elongated member is pivotable relative to the first elongated member along a horizontal axis thereby allowing the second elongated member to be leveled by movement along a vertical arc.

32. A system according to claim 31, wherein said at least one linear dimension measuring device includes a pair of measuring devices, one of said measuring devices of the pair being disposed for measurement in horizontal planes and an other of the pair being adapted for measurement in vertical planes, said pair of measuring devices being carried on said second elongated member and slidable therealong.

33. A method of gauging vehicle alignment, comprising:
mounting a linear dimension measuring device to the vehicle such that the measuring device is locatable at a position along the vehicle at which a horizontal linear dimension measurement taken by the linear dimension measuring device while located at said position will be measured relative to a datum point on the vehicle corresponding thereto;
measuring a linear dimension between the first datum point and at least another datum point spaced apart from said first datum point by operating the measuring device while said measuring device is located at the first position;

generating an output signal corresponding to the linear dimension indicated by the measuring device;

storing reference data corresponding to standard reference dimensions for a selected vehicle;

comparing the output signal with a selected reference dimension stored in said step of storing and generating an error signal indicative of the variation therebetween; and providing a visual indication of a magnitude of the variation to thereby provide a quantitative indication of structural misalignment.

34. A method according to claim 33, wherein:

said step of mounting including mounting in a manner allowing the linear dimension measuring device to be moved between said position and a second position along the vehicle, linear dimension measurements taken by the linear dimension measuring device while located at said position and said second position being measured relative to said datum point and a second datum point on the vehicle, the method further comprising the steps of:

alternately locating said measuring device at said position and said second position; and measuring respective linear dimensions between said datum point and a datum point spaced apart from said datum point by operating the measuring device while said measuring device is located at said position, and between the second datum point and at least one datum point spaced apart from said second datum point by operating the measuring device while said measuring device is located at the second position.

35. A method according to claim 33, further comprising:

mounting an other linear dimension measuring device to the vehicle in a manner in which said measuring device is locatable below said datum point, and orienting said measuring device for taking of a vertical measurement thereby;

vertically locating said other measuring device at a known vertical dimension from a given one of said at least another datum point; and measuring another vertical dimension from said other measuring device to said datum point to determine a difference in height between said datum point and said given one of said at least another datum point.

36. A method of gauging vehicle alignment, comprising:

mounting a linear dimension measuring device to the vehicle in a manner allowing the measuring device to be moved between first and second positions along the vehicle at which subsequent linear dimension measurements taken by the linear dimension measuring device while located at the first and second positions will be measured relative to first and second datum points on the vehicle, respectively;

alternately locating said measuring device at said first and second positions;

measuring respective linear dimensions between the first datum point and a datum point spaced apart from said first datum point by operating the measuring device while said measuring device is located at the first position, and between the second datum point and at least one datum point spaced apart from said second datum point by operating the measuring device while said measuring device is located at the second position;

generating an output signal corresponding to each of the linear dimensions indicated by the measuring device;

storing reference data corresponding to standard reference dimensions for a selected vehicle;

comparing the output signal with a selected reference dimension from the storage means and generating an error signal indicative of the variation therebetween; and providing a visual indication of a magnitude of the variation to thereby provide, in use, a quantitative indication of structural misalignment.

* * * * *

(12) EX PARTE REEXAMINATION CERTIFICATE (5831st)
United States Patent
Mason

(10) Patent Number: US 6,775,639 C1
(45) Certificate Issued: Jul. 24, 2007

(54) COMPUTERIZED VEHICLE ALIGNMENT SYSTEM

(76) Inventor: James Herbert Mason, 2 Wellington Street, Narrabeen NSW 2101 (AU)

Reexamination Request:
No. 90/007,515, Apr. 22, 2005

Reexamination Certificate for:
Patent No.: 6,775,639
Issued: Aug. 10, 2004
Appl. No.: 09/831,445
Filed: May 9, 2001

(22) PCT Filed: Nov. 9, 1998

(86) PCT No.: PCT/AU98/00934

§ 371 (c)(1),
(2), (4) Date: May 9, 2001

(87) PCT Pub. No.: WO99/24781

PCT Pub. Date: May 20, 1999

(30) Foreign Application Priority Data

Nov. 7, 1997 (AU) .............................................. PP0235

(51) Int. Cl.
*G01C 15/12* (2006.01)
*G01B 5/207* (2006.01)
*G01B 5/20* (2006.01)
*G01B 5/02* (2006.01)
*G01B 21/02* (2006.01)

(52) U.S. Cl. .......................................... 702/152; 33/288
(58) Field of Classification Search ........................ None
See application file for complete search history.

(56) References Cited

U.S. PATENT DOCUMENTS

| | | | |
|---|---|---|---|
| 1,597,357 A | 4/1926 | Godfrey | |
| 2,112,917 A | 4/1938 | Linn | |
| 2,442,425 A | 6/1948 | Merrill et al. | |
| 2,563,527 A | 8/1951 | Gingrich et al. | |
| 2,717,020 A | 9/1955 | Dobias | |
| 2,845,718 A | 8/1958 | Keymer | |
| 2,971,261 A | 1/1961 | Buchanan | |
| 3,330,044 A | 7/1967 | Macmillan | |
| 3,528,178 A | 9/1970 | Kunzler | |
| 3,566,476 A | 3/1971 | McWhorter | |
| 3,566,666 A | 3/1971 | Berendt et al. | |
| 3,624,914 A | 12/1971 | Kosteriva | |
| 3,626,747 A | 12/1971 | Rouis | |

(Continued)

FOREIGN PATENT DOCUMENTS

| | | |
|---|---|---|
| AU | 249933 | 10/1963 |
| AU | 71442/74 | 1/1976 |
| AU | 19014/88 | 10/1988 |
| AU | 30233/92 | 6/1993 |
| EP | 0 085 253 | 8/1983 |
| EP | 350089 | * 10/1990 |
| GB | 504 756 | 5/1939 |
| GB | 2 015 740 | 9/1979 |
| GB | 2037992 | 7/1980 |
| GB | 2 084 327 | 4/1982 |
| JP | 5 614 8002 | 11/1981 |
| WO | WO-8 101 740 | 6/1981 |
| WO | WO-8 500 219 | 1/1985 |
| WO | 9 307 446 | 4/1993 |
| WO | WO-94/02801 | 2/1994 |

*Primary Examiner*—David E Harvey

(57) ABSTRACT

A vehicle alignment gauging system measures a linear dimension and generates an output signal corresponding to the measured linear dimension. A storage device stores reference data corresponding to standard reference dimensions for a selected vehicle, and a comparator compares the output signal with a selected reference dimension from the storage means and generates an error signal indicative of the variation therebetween. A visual indication of the magnitude of the variation is provided thereby to provide a quantitative indication of structural misalignment in use.

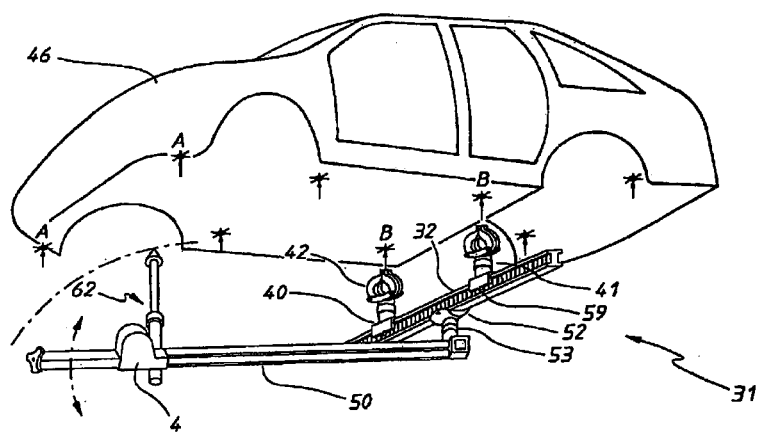

U.S. PATENT DOCUMENTS

| | | | |
|---|---|---|---|
| 3,776,022 A | 12/1973 | Lionello | |
| 3,835,692 A | 9/1974 | Hoffman | |
| 3,835,693 A | 9/1974 | Majersky | |
| 3,869,804 A | 3/1975 | Friend | |
| 4,151,737 A | 5/1979 | Specktor | |
| 4,159,574 A | 7/1979 | Samuelsson et al. | |
| 4,176,463 A | 12/1979 | Ringle | |
| 4,262,519 A | 4/1981 | Mason | |
| 4,321,754 A | 3/1982 | Colby | |
| RE31,000 E | 7/1982 | LeGrand et al. | |
| 4,339,913 A | 7/1982 | Vogelsberg | |
| 4,407,073 A | 10/1983 | Nilsspn et al. | |
| 4,408,399 A | 10/1983 | Darwood et al. | |
| 4,453,315 A | 6/1984 | Mosiman et al. | |
| 4,479,305 A | 10/1984 | Wendl et al. | |
| 4,523,384 A | 6/1985 | Giacomini | |
| 4,577,413 A | 3/1986 | Mason | |
| 4,601,105 A | 7/1986 | Yamazaki et al. | |
| 4,610,093 A | 9/1986 | Jarman et al. | |
| 4,621,435 A | 11/1986 | Higginbotham | |
| 4,630,379 A | 12/1986 | Wickmann et al. | |
| 4,640,015 A | 2/1987 | Mason | |
| 4,683,663 A | 8/1987 | Sarauer | |
| 4,719,704 A | 1/1988 | Hogg | |
| 4,756,089 A | 7/1988 | Danielsson | |
| 4,771,544 A | 9/1988 | Riutta | |
| 4,800,651 A | 1/1989 | Hanlon | |
| 4,891,889 A * | 1/1990 | Tomelleri | 33/503 |
| 4,958,439 A | 9/1990 | Dehn | |
| 5,003,703 A | 4/1991 | Swanson | |
| 5,029,397 A | 7/1991 | Palombi | |
| 5,125,164 A | 6/1992 | Fournier et al. | |
| 5,131,257 A | 7/1992 | Mingardi | |
| 5,193,288 A | 3/1993 | Stifnell | |
| 5,341,575 A * | 8/1994 | Chisum | 33/608 |
| 5,343,628 A | 9/1994 | Ham | |
| 5,430,951 A | 7/1995 | Jacky | |
| 5,435,071 A | 7/1995 | Bagwell | |
| 5,507,101 A | 4/1996 | Mason | |
| 5,647,139 A | 7/1997 | Richardson | |
| 2003/0150124 A1 | 8/2003 | Mason | |

\* cited by examiner

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 3 and 7 is confirmed.

Claim 5 is cancelled.

Claims 1, 2, 6, 10–12, 14, 22, 23, 27–29 and 32–36 are determined to be patentable as amended.

Claims 4, 8, 9, 13, 15–21, 24–26, 30 and 31, dependent on an amended claim, are determined to be patentable.

New claims 37–47 are added and determined to be patentable.

1. A system for gauging alignment of a vehicle, comprising:
    *at least one linear dimension measuring device;*
    means for mounting *the* at least one linear dimension measuring device to the vehicle in such manner that the *linear* measuring device is locatable at a *first* position along the vehicle at which a linear dimension measurement taken by the linear dimension measuring device while the *linear dimension* measuring device is located at the first position will be measured relative to a first datum point on the vehicle, whereby operation of said *linear dimension* measuring device *to take the linear dimension measurement is effected* to measure a distance to [an other] *another* datum point spaced apart from said first datum point, while said *linear dimension* measuring device is located at the first position, yielding a linear dimension between the first datum point and the other datum point:
    output signal generation means for generating an output signal corresponding to the linear dimension indicated by the operation of the *linear dimension* measuring device;
    storage means for storing reference data [is stored] corresponding to standard reference dimensions for a selected vehicle;
    comparator [mean] *means* for comparing the output signal with a selected reference dimension from the storage *means* and for generating an error signal indicative of [the] *a* variation therebetween;[and]
    variation display means for providing a visual indication of a magnitude of the variation to thereby provide a quantitative, indication of structural misalignment;
    *operator input means for accepting operator manual input controlling operation of said system for gauging alignment of a vehicle; and*
    *said variation display means, said operator input means, and said at least one linear dimension measuring device being supported together by said means for mounting to be mutually locatable at the first position along the vehicle whereat the linear dimension measurement is taken by said linear dimension measuring device and being supported in proximity to one another so as to allow an operator to initiate the linear dimension measurement using said operator input means while viewing the display means to receive direct feedback of the error signal without moving away from said linear dimension measuring device at the first position at which said linear dimension measurement is taken during said linear dimension measurement.*

2. A system according to claim 1, wherein:
    said *linear dimension* measuring [means include] *device includes* an extendable measuring tape; and
    the output signal is indicative of one of an operative and extended length of the tape.

6. A system according to claim 3, further comprising a [remotely operable] scrolling mechanism, [located one of on and adjacent the housing] *operable via said operator input means*, for permitting an operator to scroll through a range of selected reference dimensions and to view on the variation display means a corresponding sequence of calculated variation measurements derived from the error signals while [working on the vehicle] *at the first position at which said linear dimension measurement is taken during said linear dimension measurement.*

10. A system according to claim [2] *3*, further including output signal display means for displaying a visual indication of said one of the operative and extended length of the measuring tape acording to the output signal, thereby to permit visual correlation between the indicia on the measuring tape and the output signal.

11. A system according to claim 10, wherein the output signal display means associated with [each of] said measuring tape are disposed one of on and adjacent said housing.

12. A system according to claim 1, wherein said at least one linear dimension measurement device includes a pair of [said] measuring devices, one of said measuring devices of the pair being disposed for measurement in horizontal planes and an other of the pair being adapted for measurement in vertical planes.

14. A system according to claim [12] *13*, wherein said housing further includes a slidable reference pointer connectable with the vertically oriented measuring tape for engagement with selected datum points on the vehicle such that with the trammel bar in a generally horizontal orientation, the vertical tape provides a measure indicative of the vertical distance between the datum bar and the reference pointer, and the horizontal tape provides a measure of the horizontal distance between the datum bar and the reference pointer.

22. A system according to claim 1, [further comprising;] *wherein said means for mounting comprises:*
    a datum bar;
    a pair of first carriage assemblies slidably mounted to the datum bar;
    attachment means for releasably securing each of said first carriage assemblies to a respective datum point on the vehicle and thereby to suspend the datum bar in a transverse orientation beneath the vehicle; and
    a trammel bar connected at one end to said datum bar by connection means, the connection means being adjustable to selected positions along the datum bar and permitting a degree of universal movement of the trammel bar relative to the datum bar; *and wherein*

*said variation display means, said operator input means, and said at least one linear dimension measuring device are supported together by said trammel bar.*

23. A system according to claim 22, wherein the measuring [means are mountable] *device is mounted* on the trammel bar to provide measurement readings relative to the datum bar.

27. A system according to claim 1, further comprising at least one attachment mechanism for releasably securing at least a portion of said dimension measuring [means] *device* to [a] *the* vehicle being measured.

28. A system for gauging alignment of a vehicle, comprising:

a module including at least one linear dimension measuring device;

mounting structure mountable to the vehicle and supporting said module;

[at least one linear dimension measuring device] *said module being* mountably received to the vehicle *by the mounting structure* in such manner that the *linear dimension* measuring device is locatable at a *first* position along the vehicle at which a linear dimension measurement taken by the linear dimension measuring device, while the *linear dimension* measuring device is located and mounted at the first position, will be measured relative to a first datum point on the vehicle, whereby operation of said *linear dimension* measuring device *to take the linear dimension measurement is effected* to measure a distance to an other datum point spaced apart from said first datum point, while said *linear dimension* measuring device is located at the first position, yielding a linear dimension between the first datum point and the other datum point;

a signal generator for generating an output signal corresonding to the linear dimension indicated by the operation of the *linear dimension* measuring device;

storage in which reference data is stored corresponding to standard reference dimensions for a selected vehicle;

a comparator which compares the output signal with a selected reference dimension from the storage and which generates an error signal indicative of [the] *a* variation therebetween; [and]

a display on which a visual indication of a magnitude of the variation is displayed to thereby provide a quantitative indication of structural misalignment*;*

*an operator input device for accepting operator manual input controlling operation of said system for gauging alignment; and*

*said display, said operator input device, and said at least one linear dimension measuring device being supported by said module to be mutually locatable at the first position along the vehicle whereat the linear dimension measurement is taken by the linear dimension measuring device and being supported in proximity to one another so as to allow an operator to initiate the linear dimension measurement using said operator input device while viewing the display to receive direct feedback of the error signal without moving away from the linear dimension measuring device at the first position at which said linear dimension measurement is taken during said linear dimension measurement.*

29. A system according to claim 28[, further comprising mounting structure for retaining the measuring device to the vehicle,] *wherein* said mounting structure [including] *includes*:

a first elongated member mountable in fixed engagement with the vehicle; [and]

a second elongated member slidably mounted proximate a terminal end thereof to the first elongated member to allow said second elongated member to slide along the first elongated member between a first position and a second position corresponding to a first datum point and a second datum point*; and*

*said module being mounted to said second elongated member.*

32. A system according to claim 31, wherein said at least one linear dimension measuring device includes a pair of measuring devices, one of said measuring devices of the pair being disposed for measurement in horizontal planes and an other of the pair being adapted for measurement in vertical planes, said pair of measuring devices being carried on *said module on* said second elongated member and *said module being* slidable [therealong] *along said second elongated member.*

33. A method of gauging vehicle alignment, comprising:

mounting a linear dimension measuring device to the vehicle such that the measuring device is locatable at a *first* position along the vehicle at which a horizontal linear dimension measurement taken by the linear dimension measuring device, while located at said *first* position, will be measured relative to a *first* datum point on the vehicle corresponding thereto;

measuring a linear dimension between the first datum point and at least another datum point spaced apart from said first datum point by operating the measuring device while said *linear dimension* measuring device is located at the first position;

generating an output signal corresponding to the linear dimension indicated by the measuring device;

storing reference data corresponding to standard reference dimensions for a selected vehicle;

comparing the output signal with a selcted reference dimension stored in said step of storing and generating an error signal indicative of the variation therebetween; [and]

providing *a display showing* a visual indication of a magnitude of the variation to thereby provide a quantitative indication of structural misalignment*;*

*providing an operator input device for accepting operator manual input controlling operation of said linear dimension measuring device and said display and selection of said selected reference dimension, and accepting said operator manual input; and*

*supporting said display, said operator input device, and said linear dimension measuring device together with one another so as to be mutually locatable at said first position along the vehicle whereat said linear dimension measurement is taken by said linear dimension linear measuring device and supported in proximity to one another so as to allow an operator to initiate said linear dimension measurement using said operator input device while viewing said display to receive direct feedback of said error signal without moving away from said linear dimension measuring device at said position at which said linear dimension measurement is taken during said linear dimension measurement.*

34. A method according to claim 33, wherein:

said step of mounting [including] *includes* mounting in a manner allowing the linear dimension measuring device to be moved between said *first* position and a second position along the vehicle, linear dimension measurements taken by the linear dimension measuring device while located at said *first* position and said second position being measured relative to said datum point and a second datum point on the vehicle, the method further comprising the steps of:

alternately locating said *linear dimension* measuring device at said *first* position and said second position; and measuring respective linear dimensions between said datum point and a datum point spaced apart from said datum point by operating the *linear dimension* measuring device while said *linear dimension* measuring device is located at said *first* position, and between the second datum point and at least one datum point spaced apart from said second datum point by operating the *linear dimension* measuring device while said *linear dimension* measuring device is located at the second position.

35. A method according to claim 33, further comprising:

mounting [an other] another linear dimension measuring device to the vehicle in a manner in which said *another linear dimension* measuring device is locatable below said datum point, and orienting said *another linear dimension* measuring device for taking of a vertical measurement thereby;

vertically locating said [other] *another linear dimension* measuring device at a known vertical dimension from a given one of said at least another datum point; and measuring another vertical dimension from said [other] *another linear dimension* measuring device to said datum point to determine a difference in height between said datum point and said given one of said at least another datum point.

36. A method of gauging vehicle alignment, comprising:

mounting a linear dimension measuring device to the vehicle in a manner allowing the *linear dimension* measuring device to be moved between first and second positions along the vehcile at which subsequent linear dimension measurements taken by the linear dimension measuring device while located at the first and second positions will be measured relative to first and second datum points on the vehicle, respectively;

alternately locating said measuring device at said first and second positions;

measuring respective linear dimensions between the first datum point and a datum point spaced apart from said first datum point by operating the *linear dimension* measuring device while said *linear dimension* measuring device is located at the first position, and between the second datum point and at least one datum point spaced apart from said second datum point by operating the *linear dimension* measuring device while said *linear dimension* measuring device is located at the second position;

generating an output signal corresponding to each of the linear dimensions indicated by the *linear dimension* measuring device;

storing reference data corresponding to standard reference dimensions for a selected vehicle;

comparing the output signal with a selected reference dimension from the storage means and generating an error signal indicative of the variation therebetween; and providing *a display showing* a visual indication of a magnitude of the variation to thereby provide, in use, a quantitative indication of structural misalignment;

providing an operator input device for accepting operator manual input controlling operation of said linear dimension measuring device and said display and selection of said selected reference dimension, and accepting said operator manual input; and supporting said display, said operator input device, and said linear dimension measuring device together with one another so as to be mutually alternately locatable at said first position and said second position along the vehicle whereat said linear dimension measurement is taken by said linear dimension measuring device and supported in proximity to one another so as to allow an operator to initiate said linear dimension measurement using said operator input device while viewing said display to receive direct feedback of said error signal without moving away from said linear dimension measuring device at said first position and said second position at which said linear dimension measurement is taken during said linear dimension measurement.

37. The system according to claim 1, wherein:

said at least one linear dimension measuring device is disposed in a housing:

said display means is disposed one of on and adjacent the housing to provide direct feedback of the error signal to the operator while working on the vehicle; and said operator input means being disposed one of on and adjacent the housing to allow the operator manual input without need for the operator to move away from the position at which said linear dimension measurement is taken during said linear dimension measurement.

38. The system according to claim 28, wherein:

said at least one linear dimension measuring device is disposed in a housing;

said display is disposed one of on and adjacent said housing to provide direct feedback of said error signal to the operator while working on the vehicle; and said operator input device is disposed one of on and adjacent said housing to allow said operator manual input without need for the operator to move away from said position at which said linear dimension measurement is taken during said linear dimension measurement.

39. The system according to claim 28, further comprising a scrolling mechanism, operable via said operator input device, for permitting an operator to scroll through a range of selected reference dimensions and to view on said variation display means a corresponding sequence of calculated variation measurements derived from said error signal while the operator is at said first position at which said linear dimension measurement is taken.

40. The method according to claim 33, further comprising:

providing said linear dimension measuring device in a housing on a module which is locatably supported from the vehicle:

positioning said display one of on and adjacent said housing; and positioning said operator input device at one of on and adjacent said housing to allow the operator manual input without need for the operator to move away from viewing said display.

41. A system for gauging alignment of a vehicle, comprising:

a mountable apparatus adapted for directed mounting to a vehicle and which is adjustable on the vehicle to provide linear measurements between at least two spaced apart datum points on said vehicle by simultaneous contact with said datum points, said measurements yielding a linear dimension corresponding to a relative distance between said datum points;

said mountable apparatus including a measuring module including a housing and at least one linear measuring device locatable at a first position along the vehicle for measuring said relative distance between said datum points while at said position;

said at least one linear dimension measuring device being mountably received to the vehicle by said mountable apparatus in such manner that the linear dimension measuring device is locatable at said first position along the vehicle at which a linear dimension measurement, taken by the linear dimension measuring device while the linear dimension measuring device is located and mounted at the first position, will be measured relative to a first datum point on the vehicle of said at least two spaced apart datum points, whereby operation of said linear dimension measuring device is effected to measure a distance to another datum point, of said at least two spaced apart datum points, which is spaced apart from said first datum point while said linear measuring device is located at said first position yielding a linear dimension between said first datum point and said other datum point as said relative distance between said datum points:

a signal generator for generating an output signal corresponding to said linear dimension indicative of said relative distance indicated by said operation of the linear dimension measuring device;

storage in which reference data is stored corresponding to standard reference dimensions for a selected vehicle;

a comparator which compares the output signal with a selected reference dimension from said storage and which generates an error signal indicative of said variation therebetween;

a display on which a visual indication of a magnitude of said variation is displayed to thereby provide a quantitative indication of structural misalignment;

said display being suported by said mountable apparatus on or immediately adjacent said housing; and one or more principle command keys supported by said mountable apparatus and located on or immediately adjacent said display to allow said system to be operated without need for the operator to move away from said position along said vehicle during said datum point measurement.

42. A system for gauging alignment of a vehicle, comprising:

means for mounting at least one linear dimension measuring device to the vehicle in such manner that the linear dimension measuring device is locatable at a position along the vehicle at which a linear dimension measurement taken by said linear dimension measuring device while the linear dimension measuring device is located at the first position will be measured relative to a first dataum point on the vehicle, whereby operation of the linear dimension measuring device to take the linear measurement is effected to measure a distance to another datum point spaced apart from said first datum point, while said linear dimension measuring device is located at the first position, yielding a linear dimension between the first datum point and the other datum point;

output signal generation means for generating an output signal corresponding to the linear dimension indicated by the operation of the linear dimension measuring device;

storage means for storing reference data corresponding to standard reference dimensions for a selected vehicle;

comparator means for comparing the output signal with a selected reference dimension from the storage means and for generating an error signal indicative of a variation therebetween;

variation display means for providing a visual indication of a magnitude of the variation to thereby provide a quantitative indication of structural misalignment; and operator input means for accepting operator manual input controlling operation of said system for gauging alignment, said operator input means including a remotely operable scrolling mechanism permitting an operator to scroll through a range of selected reference dimensions and to view on the variation display means a corresponding sequence of calculated variation measurements derived from the error signal while working on the vehicle, said operator input means being disposed immediately adjacent the variation display means to allow the operator to provide manual control input while viewing the display means without moving away from the vehicle during said datum point measurement.

43. A system for gauging alignment of a vehicle, comprising:

a module including at least one linear dimension measuring device;

mounting structure mountable to the vehicle and supporting said module;

said module being mountably received to the vehicle by the mounting structure in such manner that the linear dimension measuring device is locatable at a first position along the vehicle at which a inear dimension measurement taken by the linear dimension measuring device, while the linear dimension measuring device is located and mounted at the first position, will be measured relative to a first datum point on the vehicle, whereby operation of said linear dimension measuring device to take the linear dimension measurement is effected to measure a distance to an other datum point spaced apart from said first datum point, while said linear dimension measuring device is located at the first position, yielding a linear dimension between the first datum point and the other datum point;

a signal generator for generating an output signal corresponding to the linear dimension indicated by the operation of the linear dimension measuring device;

storage in which reference data is stored corresponding to standard reference dimensions for a selected vehicle;

a comparator which compares the output signal with a selected reference dimension from the storage and which generates an error signal indicative of a variation therebetween;

a display on which a visual indication of a magnitude of the variation is displayed to thereby provide a quantitative indication of structural misalignment;

an operator input device for accepting operator manual input controlling operation of said system for gauging alignment; and said display, said operator input device, and said at least one linear dimension measuring device being supported by said mounting structure in proximity to one another so as to allow an operator to initiate said linear dimension measurement using said operator input device while viewing said display to receive direct feedback of said error signal without moving away from said at least one linear measuring device at said first position at which said linear dimension measurement is taken during said linear dimension measurement.

44. The system according to claim 43, further comprising a scrolling mechanism, operable via said operator input device, for permitting an operator to scroll through a range of selected reference dimensions and to view on said variation display means a corresponding sequence of calculated variation measurements derived from said error signal while the operator is at said first position at which said linear dimension measurement is taken.

45. A system for gauging alignment of a vehicle, comprising:

a module including at least one linear dimension measuring device;

mounting structure mountable to the vehicle and supporting said module;

said module being mountably received to the vehicle by the mounting structure in such a manner that the linear dimension measuring device is locatable at a first position along the vehicle at which a linear dimension measurement taken by the linear dimension measuring device, while the linear measuring device is located and mounted at the first position, will be measured relative to a first datum point on the vehicle, whereby operation of said linear dimension measuring device to take the linear dimension measurement is effected to measure a distance to an other datum point spaced apart from said first datum point, while said linear dimension measuring device is located at the first position, yielding a linear dimension between the first datum point and the other datum point;

a signal generator for generating an output signal corresponding to the linear dimension indicated by the operation of the linear dimension measuring device;

storage in which reference data is stored corresponding to standard reference dimensions for a selected vehicle;

a comparator which compares the output signal with a selected reference dimension from the storage and which generates an error signal indicative of a variation therebetween;

a display on which a visual indication of a magnitude of the variation is displayed to thereby provide a quantitative indication of structural misalignment;

an operator input device for accepting operator manual input controlling operation of said system for gauging alignment;

a scrolling mechanism, operable via said operator input device, for permitting an operator to scroll through a range of selected reference dimensions and to view on said display a corresponding sequence of calculated variation measurements derived from said error signal while the operator is at said first position at which said linear dimension measurement is taken; and said display and said operator input device being provided in a common housing structure locatable at said first position along the vehicle whereat said linear dimension measurement is taken by said linear measuring device and being supported in proximity to one another so as to allow an operator to initiate said linear dimension measurement and operation of said scrolling mechanism using said operator input device while viewing said display to receive direct feedback of said error signal without moving away from said linear measuring device at said first position at which said linear dimension measurement is taken during said linear dimension measurement.

46. The system for gauging alignment of a vehicle according to claim 45, further comprising:

a computer including said storage, said computer being positioned remote to said mounting structure;

a second display in the form of a computer screen display device located proximate said computer; and said computer being interconnected with said linear dimension measuring device, and said display and said operator input device in said common housing structure.

47. The system for gauging alignment of a vehicle according to claim 46, wherein said computer is interconnected with said linear dimension measuring device, and said display and said operator input device in said common housing structure via wireless transmission.

* * * * *